June 10, 1941.  L. B. ROTH  2,244,967
POWER MOWER
Filed Aug. 15, 1938  3 Sheets-Sheet 1

L. B. ROTH  INVENTOR.
BY *William C. Blackburn*
ATTORNEY

June 10, 1941.  L. B. ROTH  2,244,967
POWER MOWER
Filed Aug. 15, 1938  3 Sheets-Sheet 3

L. B. ROTH  INVENTOR.
BY William C. Blackburn
ATTORNEY

Patented June 10, 1941

2,244,967

UNITED STATES PATENT OFFICE 2,244,967

POWER MOWER

Lester B. Roth, Prophetstown, Ill., assignor to Eclipse Lawn Mower Company, Prophetstown, Ill., a corporation of Illinois Application August 15, 1938, Serial No. 224,914

4 Claims. (Cl. 56—26)

The present invention relates to power mowers and more particularly to power mowers of the wheel type, i. e., having traction and castor wheels.

Although the art of power mowers has been highly developed, certain limitations have been accepted as necessarily incident to the operation of such mowers. One of the principal objects of such limitations is the speed of the mower when it is turned. When the mower is brought up to the end of a swath and it is desired to turn it through one hundred and eighty degrees, the customary practice has been not only to shut off the power but also to tilt the mower so that one of the traction wheels is clear of the ground. Lifting of a wheel has been found necessary in order to avoid mutilating the turf with the wheels, even where the two traction wheels are differentially connected. This has been due to the failure of the prior constructions to differentiate properly under power.

It is accordingly an object of the present invention to provide power mowers which may be turned under power with the wheels thereof on the ground without damage to the turf. Further objects are to provide an arrangement of parts in a power mower in which better differentiating action between the traction wheels is obtained, and to provide an arrangement of parts in a power mower which is a simple, light-weight construction, which is adequately strong, and which may be readily assembled.

For a more complete understanding of the present invention, reference is had to the following description, together with the subjoined claims and the accompanying drawings in which:

Fig. 2a is a detail view showing the relationship of the sprockets 24, 26 and 69;

Figure 1:
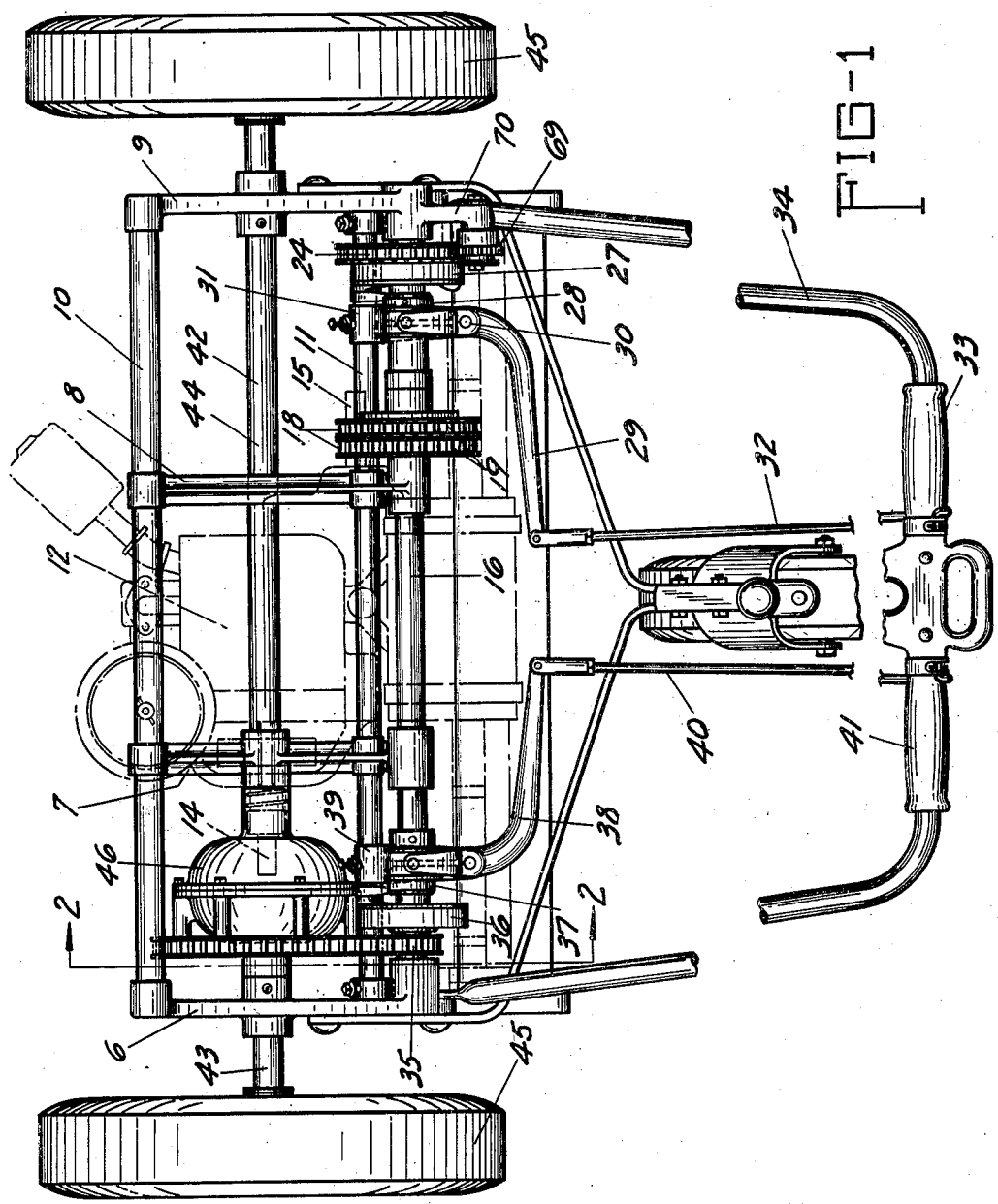
Fig. 1 is a plan of a mower embodying the improvements of the present invention.
Figure 2:
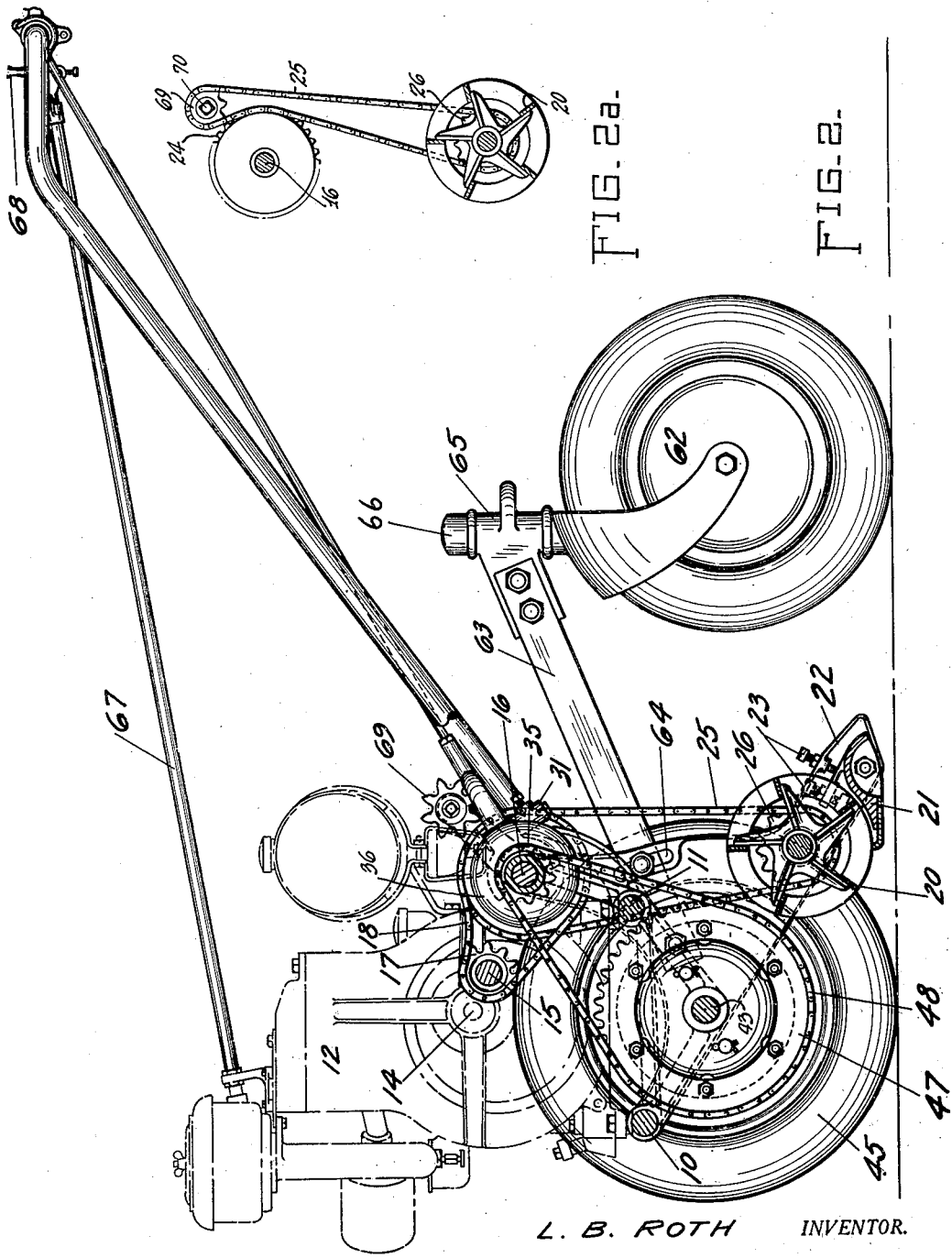
Fig. 2 is a vertical section of the mower shown in Fig. 1, on the line 2—2.
Figure 3:
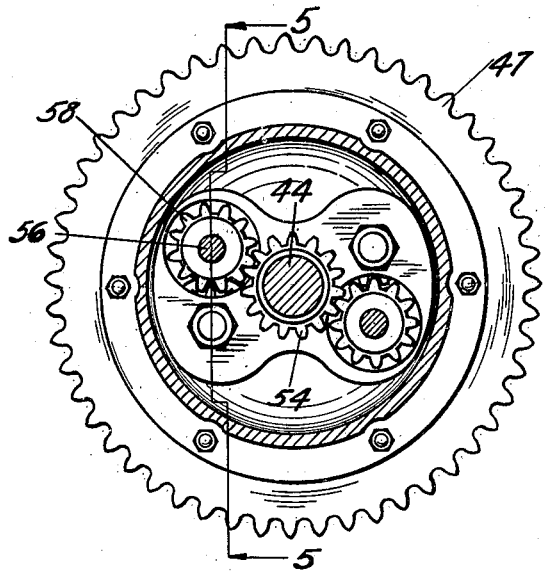
Fig. 3 is a section through the differential connecting the sections of the wheel shaft shown in Fig. 1, the section being taken on the plane of the line 3—3 in Fig. 4, except that it shows the internal structure in elevation.
Figure 5:
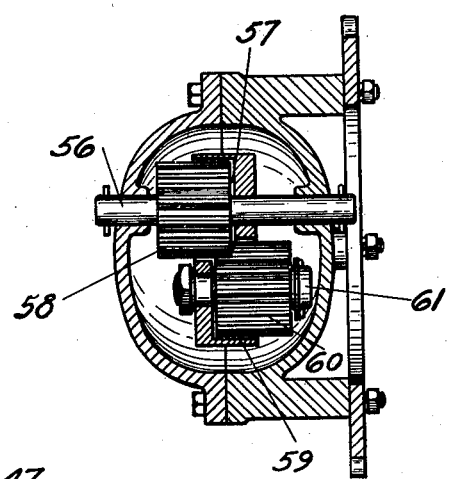
Fig. 5 is a section substantially on the line 5—5 in Fig. 3.
Figure 4:
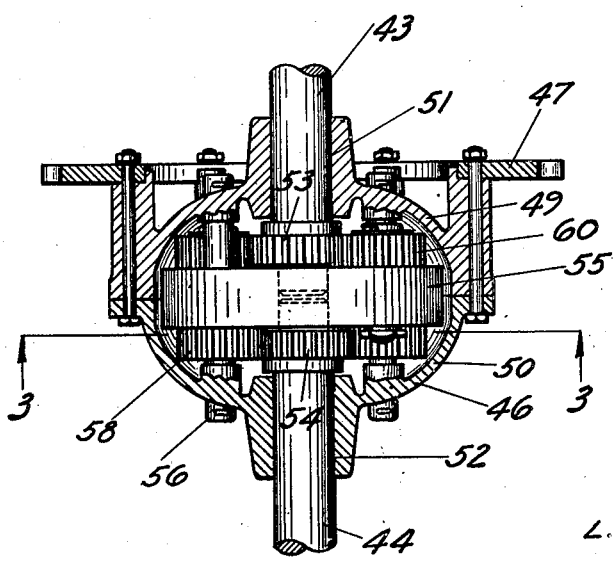
Fig. 4 is a plan of the differential with portions of the casing broken away to show an edge view of the internal construction thereof.

In the mower shown in the drawings, a plurality of frame plates 6, 7, 8, and 9 are provided which have aligned openings therein for the reception of frame shafts 10 and 11. Any suitable motor 12, such as a gasoline engine, may be provided and is mounted approximately centrally on the frame formed by the frame plates and frame shafts. The motor may be provided with a shaft 14 to be turned for starting and with a motor drive shaft 15.

A power shaft 16 is carried in bearings in the frame plates 6, 7, 8, and 9 and is located upwardly and rearwardly of the openings through which frame shaft 11 extends. Power is communicated from the drive shaft to the power shaft by a pair of sprocket wheels 17 secured to the drive shaft through a pair of chains 18 in engagement with a pair of sprocket wheels 19 secured to the power shaft.

A cutting reel 20 and a cutter bar 21 are pivotally mounted in arms 22 of the frame plates 6 and 9. The cutter bar 21 is held in adjusted position with its cutting edge in proximity to the cutting reel by a pair of bolts 23 at each end of the bar. A sprocket wheel 24 is carried by power shaft 16 for driving the reel by a chain 25 and a sprocket wheel 26 secured to the reel. A clutch 27, of conventional construction, is arranged so that, upon longitudinal movement of the sleeve 28 along the power shaft 16, the sprocket wheel 24 is engaged in or disengaged from driving relation with the power shaft. Clutch arm 29, pivoted at 30 to a bracket 31 which is mounted on frame shaft 11, is provided with a yoke which engages in a circumferential groove in the sleeve 28. One end of an operating rod 32 is pivoted to the end of clutch arm 29 opposite the yoke, while the other end of the rod is hook-shaped and has the end of the hook pivoted to grip 33 carried by handle 34. The handle 34 is generally U-shaped, having the grip 33 at the bight portion thereof, and has the two ends secured to frame plates 6 and 9.

A second clutch assembly, similar to that above described, and comprising a sprocket wheel 35, clutch 36, sleeve 37, clutch arm 38, bracket 39, rod 40, and grip 41, is mounted on the opposite side of the mower from that above described. A wheel shaft 42, comprising two sections 43, 44, is carried in bearings in the frame plates. Wheel shaft section 43 is carried by a bearing in frame plate 6, and section 44 by bearings in plates 7 and 9. These sections 43 and 44 are freely slidable in the bearings. A traction wheel 45 is secured to the outer end of each wheel shaft section and each wheel has a diameter of at least sixteen inches. A differential 46 connects the ends of the sections 43, 44 and has mounted thereon a sprocket wheel 47. A chain 48 operatively connects the sprocket wheel 35 and the sprocket wheel 47.

The differential 46 has a casing composed of two mating halves 49, 50 which are provided with aligned bearings 51, 52 through which the proximal ends of the wheel shaft sections extend. A plurality of bolts secures the sprocket wheel 47 and the mating halves 49, 50 together. Gears 53, 54 are secured to the inner ends of the sections 43, 44, respectively, and are provided with collars which bear against bearings 51, 52 and prevent motion of the wheel shaft longitudinally. The sections 43, 44 are provided with reduced end portions which fit into a central opening in a plate 55 within the casing.

A pair of pins 56 pass through the casing walls parallel to the wheel shaft and through openings in the plate 55 whereby, when the casing rotates, the plate 55 must of necessity also rotate. A recess 57 is provided on one side of the plate about each of the pins 56 of a size to accommodate gears 58 in mesh with gear 54, on shaft section 44. The depth of recesses 57 is somewhat more than half the thickness of the plate. Each of a second pair of recesses 59 has a gear 60, mounted on a post 61 in the base of the recesses. These gears 60 are of a size to mesh with the gear 53 on the shaft 43 and extend into the plate somewhat more than half the depth of the plate. The recesses 57 and 59 are so disposed radially about the wheel shaft that the adjacent edges of gears 58 and 60 are in mesh. Accordingly, if the casing is driven and the drag on the two wheels is the same, both wheels will be driven at the same speed. If, however, the drag is unequal, differentiation occurs and the wheels are driven at different speeds.

A castor wheel 62 is carried by arms 63 pivoted to the frame plates 6 and 9. To secure the arms 63 in adjusted position, the frame plates 6 and 9 are provided with slots 64 in which a clamping bolt, carried in an opening in each arm 63, may move. At their other ends, the arms 63 are secured to a pivot 65 for the pin 66 of the castor wheel.

In order to vary the speed of the mower, a throttle connector 67 extends from the mower to the bight portion of the handle 34 where a lever 68 is provided for actuating the throttle.

Sharpening of the mower may be effected by reversing the direction of rotation of the reel 20 and applying abrasive thereto. To effect reversal of the reel, an idle sprocket wheel 69 is carried in the same plane as the sprocket wheel 24, above and to the rear thereof. The chain which normally passes around sprocket wheel 24 is removed therefrom and passed around sprocket wheel 69, which is so positioned that the forward run of the chain will be actuated by sprocket wheel 24. The sprockets 24, 26, and 69 are so positioned that a straight line tangential to the sprockets 26 and 69 on the side toward the sprocket 24 will pass inside of the edge of the latter sprocket, and a chain connecting these sides of the sprockets 26 and 69 will engage the edge of the sprocket 24 and be bent thereby so that the chain will be held in driving engagement with the sprockets. Simultaneously, the other run of the chain will be tangential to the other sides of the sprockets 26 and 69 and will be substantially straight, being out of contact with the sprocket 24. The sprocket wheel 69 is preferably positioned such a distance above sprocket wheel 24 that the chain which normally drives the reel forward is the correct length for reversing the direction. The sprocket wheel 69 is carried by a bracket 70 on the frame plate 9.

With the two clutches 27 and 36 out of engagement, the motor 12 is started. By suitable operation of the grip 41, the clutch 36 may be engaged and the mower driven to the area to be mowed. The grip 33 may then be turned to engage the clutch 27 and, through the sprocket wheel 24, chain 25, and sprocket wheel 26, the cutting reel 20 is driven. Power from the power shaft 16 is transmitted to the wheels 47 through the clutch 36, sprocket wheel 35, chain 47, sprocket wheel 48, differential 46, and wheel shaft 42.

When the clutch 36 is in engagement, the sprocket 47 and the differential housing 49, 50 are constantly driven. These carry with them the pins 56 and the plate 55 through which the pins extend. With the drag on both wheels 45 the same, the gears 58 and the gears 60 move with the differential housing. However, if for any reason there is more resistance to the travel of one wheel than to the other, the wheels are driven at different speeds. Thus, with the differential housing driven at a constant speed, and with greater resistance to the turning of shaft 43 than of shaft 44, the shaft 43 will not turn as fast as the differential housing. This will, through the gears 53, 60, 58, and 54 in the order named, turn the shaft 44 at a speed much faster than the differential housing. It should be noted that with this construction during turning of the mower the driving force is communicated to both wheels at all times as distinguished from mowers in which each wheel is driven through a ratchet. In such a construction, the speed of the inside wheel going around a corner is the normal speed of travel, and the outer wheel which is ratcheting at the time is not being driven. Thus such a mower has to be pushed around a corner whereas, with the present construction, the mower will drive itself around a corner. If the operator merely holds back on one side of the mower, the mower will drive itself about that side as a pivot.

When the mower pivots about a corner, there is a thrust of the mower along the wheel shafts, the whole mower body tending to move toward the outer side of the corner. The differential prevents this movement. The flanges on the differential housing extending along the shaft sections 43, 44 engage the frame plates of the mower, so that the differential housing cannot move. The shaft sections 43, 44 would be able to move through the differential housing except that the gears 53, 54 are secured to the ends of shaft sections 43, 44. Upon initiation of movement in either direction, the collar portion of one of the gears 53, 54 comes into thrust engagement with the differential housing, preventing further movement.

When I first departed from the custom in the power mower art of using small traction wheels and built a power mower having large differential traction wheels, my purpose was mainly to improve the appearance of power mowers. No difference in the operation of the mower was expected. However, it was found that in operation the mower behaved entirely differently from power mowers having small wheels. It was found by experimentation with various sizes of wheels that the new characteristic in operation commenced with wheels of sixteen-inch diameter and that this characteristic became more manifest as the size increased above sixteen inches. Accordingly, I prefer to employ wheels from about twenty to about thirty inches in diameter.

An exact analysis of what the difference in operation is between large and small wheels has proven most difficult. The difference lies in the action when turning the mower, as at the end of a swath when it is desired to reverse the direction of the mower to cut the next swath. Mowers of the present variety, when cutting, travel at a rate of about five to seven miles an hour. To turn, all that is necessary is to swing the handle to one side. The mower turns freely and will not ruin the turf. Although turns may be taken at full speed, due to the high speed of this mower it is much safer to throttle the motor down a bit in order to avoid the possibility of failing to catch the handle at the end of the turn. However, with experience in operation, one may safely take turns at much higher speed than when beginning to learn how to operate high speed mowers in accordance with the present invention.

With power mowers equipped with differentiated small wheels, turning as above described is impossible. Such mowers ordinarily travel about two miles per hour. But even with such low speeds, it is necessary to throttle down to avoid turf injury. Even with the mower throttled down, turf injury is common unless one wheel of the mower is raised when turning. The difference between large and small wheels is best illustrated by actual operation of power mowers equipped with such wheels.

While I have above described in detail a specific power mower, I do not desire to be limited to the details thereof except as so specifically limited by the appended claims.

Having now described my invention, I claim:

1. In a power mower, a frame comprising a plurality of frame plates having aligned openings and frame rods in said openings, a pair of wheel shaft sections, bearings in said frame plates carrying said wheel shaft sections and allowing longitudinal movement of said wheel shaft sections therethrough, a traction wheel on each of said shaft sections located exteriorly of said frame plates, a gear on the inner end of each of said shaft sections, a member rotatable on said shaft sections, engaging both of said gears and engaging one of said frame plates at each of its extremities along said shaft sections, whereby to hold said shaft sections against longitudinal movement, and gearing movable with said member and engaging and differentially connecting said gears.

2. In a power mower, a frame comprising a plurality of frame plates having aligned openings and frame rods in said openings, a pair of wheel shaft sections, bearings in said frame plates carrying said wheel shaft sections and allowing longitudinal movement of said wheel shaft sections therethrough, a traction wheel on each of said shaft sections located exteriorly of said frame plates, a gear on the inner end of each of said shaft sections, a member rotatable on said shaft sections, engaging both of said gears and engaging one of said frame plates at each of its extremities along said shaft sections, whereby to hold said shaft sections against longitudinal movement, and a pair of intermeshing gears rotatable with said member, each of said intermeshing gears meshing with a respective one of said gears on said shaft sections.

3. In a power mower, a frame comprising a plurality of frame plates having aligned openings and frame rods in said openings, a pair of wheel shaft sections, bearings in said frame plates carrying said wheel shaft sections and allowing longitudinal movement of said wheel shaft sections therethrough, a traction wheel on each of said shaft sections located exteriorly of said frame plates, a gear on the inner end of each of said shaft sections, a member rotatable on said shaft sections, engaging both of said gears and engaging one of said frame plates at each of its extremities along said shaft sections, whereby to hold said shaft sections against longitudinal movement, gearing movable with said member and engaging and differentially connecting said gears, and power means to rotate said member.

4. A power mower comprising a frame, aligned wheel shaft bearings in said frame, wheel shaft sections carried by said bearings and freely slidable therein, a traction wheel on each of said sections outside of said frame, a shaft gear secured to the inner end of each shaft section, a differential casing having bearings therein for each of said wheel shaft sections, said differential casing being between and in engagement at both of its extents thereof along said wheel shaft sections with portions of said frame and said shaft gears being in operative thrust engagement with said casing, whereby to prevent sliding of said wheel shaft sections, and differentiating gears in said casing operatively connecting said shaft gears.

LESTER B. ROTH.